March 15, 1932.  C. G. MUNTERS  1,849,685
REFRIGERATION
Filed March 22, 1928
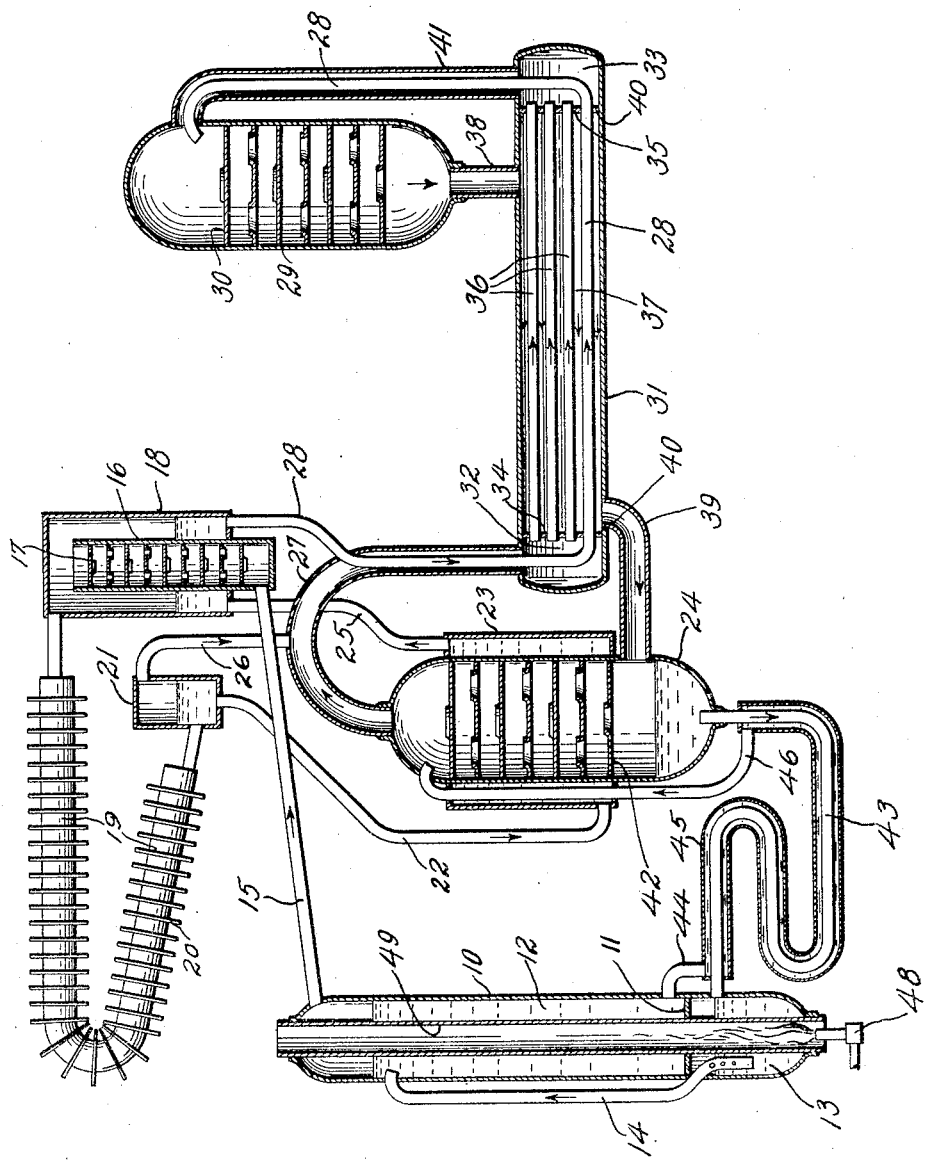

Patented Mar. 15, 1932

1,849,685

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

REFRIGERATION

Application filed March 22, 1928. Serial No. 263,950.

My invention relates to refrigerating systems of the absorption type and particularly to refrigerating apparatus of the absorption type for use in connection with household refrigerators.

The object of my invention is to provide a novel and efficient means of abstracting heat from such apparatus. The invention is particularly applicable to the type of apparatus which employs an auxiliary agent in the presence of which the cooling agent evaporates for equalizing pressure.

Amongst the features of my invention are: air cooling of an absorption machine; indirect cooling of an absorber of an absorption machine and direct cooling of the condenser; cooling of the absorber by vaporization of a fluid contained within the system of apparatus; cooling an absorber by conducting liquid refrigerant from the condenser to heat exchange relation with the absorber and thence conducting the refrigerant to the evaporator while returning so much of the refrigerant to the condenser as is vaporized in the process of cooling; and cooling the absorber by liquid refrigerant at the same, or substantially at the same, pressure as that existing in the absorber and in other parts of the system.

Further objects and advantages of my invention will appear from the following description taken in connection with the accompanying drawing which shows more or less diagrammatically my invention applied to one form of refrigerating apparatus.

In the accompanying drawing reference character 10 designates the generator which is made of a cylindrical metal shell divided by a partition 11 into a main generator 12 and an auxiliary generator 13. A thermosiphon riser pipe 14 connects the auxiliary generator with the main generator. A vapor conduit 15 is connected with the upper part of the generator and is connected with the bottom of an inner rectifier chamber 16, conduit 15 being inclined to permit liquid to flow therein downwardly toward the generator. Member 16 contains a series of baffling members 17 and has an opening at the top into the upper part of a rectifier chamber 18. The upper part of chamber 18 is connected to a condenser 19 which is equipped with fins 20 for permitting the condenser to be cooled by air. The condenser discharges into a receptacle 21. The bottom of receptacle 21 is connected by means of conduit 22 with a cooling jacket 23 surrounding absorber 24. The upper part of cooling jacket 23 is connected by means of a conduit 25 to the bottom of chamber 18. A vent pipe 26 leads from the upper part of vessel 21 and is connected to a conduit 27 leading from the absorber.

From the bottom of chamber 18 liquid passes through conduit 28 and into evaporator 29. Evaporator 29 contains a series of disks 30. The evaporator and absorber may be of the type shown in Patent No. 1,609,334 granted December 7, 1926. The evaporator is in heat exchange relation with the objective of refrigeration, such as the food space of a household refrigerator cabinet.

A heat exchanger 31 is arranged horizontally and is connected to the absorber and evaporator. Conduit 27 connects the top of the absorber with an end chamber 32 of the heat exchanger. The other end chamber 33 is connected by means of conduit 41 with the upper part of the evaporator. Chambers 32 and 33 are separated off by means of two heads 34 and 35 through which extend tubes 36 which connect the chambers. The space 37 surrounding tubes 36 is connected to the bottom of the evaporator by means of conduit 38 and to the absorber by means of conduit 39. Drain holes 40 are formed at the bottoms of tube heads 34 and 35.

The absorber contains a series of disks 42 for distributing liquid. A conduit 43 connects the lower part of the absorber with the auxiliary generator. Conduits 44, 45 and 46 connect the lower part of the main generator with the upper part of the absorber. Conduits 43 and 45 are arranged in heat exchange relation.

The operation of the apparatus is as follows:

The generator contains refrigerant or cooling agent in solution as, for example, ammonia dissolved in water. Heat applied by means of gas burner 48 extending into flue 49 or by any other suitable means causes expulsion of ammonia from solution in the generator. The vapor of ammonia passes through conduit 15 and into rectifier member 16. Here entrained water vapor is separated out as explained in Patent No. 1,808,723, granted June 2, 1931. Ammonia vapor passes out from the top of chamber 17 and into condenser 19 where it is condensed due to the cooling action of surrounding air. The liquefied ammonia runs into vessel 21 and thence through conduit 22 into jacket 23 and through conduit 25 to member 18. Vapor of ammonia leaving the surface of liquid in chamber 18 passes upwardly and back to the condenser. The liquid in chamber 18 serves to condense water vapor within member 17. Liquid ammonia passes from chamber 18 through conduit 28 and into evaporator 29. In the evaporator the ammonia meets an auxiliary agent, preferably hydrogen, introduced thereinto through conduit 41. The ammonia diffuses into the hydrogen and heat is abstracted from the surroundings thus producing refrigeration. A mixture of gases is formed which passes downwardly through the evaporator, through conduit 38 and into space 37. From space 37 the mixture of gases passes through conduit 39 to absorber 24. In the absorber, weak absorption liquid supplied through conduit 46 absorbs ammonia thus liberating the hydrogen. The hydrogen flows through conduit 27, through space 32, through tubes 36, through space 33 and through conduit 41 back to the evaporator. A continuous circulation of hydrogen is produced due to the difference in specific weight of a mixture of ammonia and hydrogen on the one hand and hydrogen alone on the other hand. Strong absorption liquid collected in the bottom of the absorber passes through conduit 43 and into the auxiliary generator 13. Heat applied to the auxiliary generator causes liquid and vapor to pass upwardly through conduit 14 to the main generator. Weak liquid flows by gravity through conduits 44, 45 and 46 to the upper part of the absorber. A continuous thermo-siphon circulation of absorption liquid takes place between the generator and absorber.

All parts of the apparatus are at the same pressure and the ammonia in jacket 23 is at the same pressure or substantially the same pressure as in the absorber. Heat is transmitted from the absorber to the refrigerant within jacket 23 and thence upwardly to the condenser. The condenser is the only element exposed to outside cooling. This is of importance in the application of such apparatus to a household refrigertor as the absorber can be placed inside the refrigerator housing and need not be provided with a flue or other means for cooling the same by air. Furthermore, the amount of cooling of the absorber is proportional to load on the apparatus so that a more even balance of heat input and heat output is obtained.

While I have described one form of my invention, it is readily understood that I am not limited to the form and arrangement of the apparatus shown but the present invention can be carried out by use of a great many forms of apparatus. To illustrate, if I were to apply the present invention to a household refrigerator I would preferably extend the apparatus vertically and place the generator and absorber in a compartment below the food space. I might place the absorber inside the insulation in the wall of the refrigerator. The generator and absorber might be made horizontal for this purpose and the heat exchanger arranged vertically. The condenser would be placed in the upper part of the apparatus and it need not necessarily have a flue. The condenser could be placed above the refrigerator at the back. The various conduits would be led through the insulation material.

It will be seen that by boiling refrigerant in jacket 23 a lively circulation of cooling medium past the absorber is obtained since, due to the formation of gas, the fluid in conduit 25 will be very much lighter than the fluid in conduit 22. The lower the absorber is placed below the condenser and rectifier the stronger will be this circulation.

Having thus described my invention, what I claim is:

1. Refrigerating apparatus of the absorption type comprising a generator, an absorber, an evaporator, a condenser, means to conduct vapor from the generator to the condenser, a vessel arranged to receive liquid from the condenser, a member in heat exchange relation with said absorber, a conduit connecting said vessel with said member and means for conducting vapor from said member to the condenser.

2. Refrigerating apparatus of the constant pressure absorption type comprising an absorber and a condenser connected to be at the same pressure and a cooling member for the absorber constructed and arranged to absorb the major portion of the heat rejected by the absorber and connected with the condenser so as to be at substantially the same pressure as the condenser and the absorber.

3. Refrigerating apparatus of the absorption type comprising a generator, a rectifier chamber, a condenser, an absorber, an evaporator, an absorber cooling member and means to conduct refrigerant in cycle series through the generator, condenser, absorber cooling member, rectifier chamber, evaporator and absorber.

4. Refrigerating apparatus of the absorption type comprising a generator, a rectifier chamber, a condenser, an absorber, an evaporator, an absorber cooling member and means forming a major cycle for circulation of a cooling agent in series through the generator, condenser, cooling member, rectifier chamber, evaporator and absorber, a local cycle for circulating an auxiliary agent through the evaporator and absorber and a local cycle for circulating absorption liquid through the absorber and generator.

5. That improvement in the art of refrigeration through the agency of a constant pressure type absorption system including an absorber and a condenser which consists in cooling the absorber exclusively by vaporization of refrigerant liquefied in the system and at the same pressure as the absorber and the condenser and substantially separated from other fluid of the system.

6. Refrigerating apparatus of the absorption type comprising a generator, a condenser, an absorber cooling member, an evaporator, an absorber and conduits connecting the aforesaid parts for flow of refrigerant from the generator through the condenser and to the absorber cooling member and for circulating vapor from said absorber cooling member through said condenser and liquid from said absorber cooling member to said evaporator and for circulating absorption liquid between the generator and the absorber.

7. A continuous process of refrigeration which comprises diffusing a liquid cooling agent into an auxiliary agent and thus taking up heat, introducing the mixture of cooling agent and auxiliary agent thus formed into the presence of absorption liquid to absorb the cooling agent and liberate the auxiliary agent, returning the liberated auxiliary agent back to the presence of liquefied cooling agent, removing the absorbed cooling agent in the absorption liquid from the presence of the liberated auxiliary agent, expelling the cooling agent from solution and thus producing vapor of the cooling agent, returning absorption liquid to the presence of the mixture of cooling agent and auxiliary agent, liquefying the vapor of the cooling agent expelled from solution, conducting the liquefied vapor of the cooling agent in heat exchange relation with the vapor of cooling agent being absorbed by the absorption liquid and being separated from the auxiliary agent and thus vaporizing liquefied cooling agent, reliquefying the last vaporized cooling agent and conducting the liquefied cooling agent into the presence of the auxiliary agent.

8. Refrigerating apparatus comprising a generator, a condenser, an evaporator, an absorber, said condenser being constructed to be cooled by external means and means to circulate refrigerant from the condenser into heat exchange relation with the absorber and directly back to the condenser in order to cool the absorber.

9. Refrigerating apparatus comprising a generator, a condenser, an evaporator, an absorber, said condenser being constructed to be cooled by external means and means to circulate refrigerant from the condenser into heat exchange relation with the absorber and back to the condenser without passing through the evaporator or generator for cooling the absorber.

10. That improvement in the art of refrigerating by the aid of a system including a generator, a condenser, an absorber and an evaporator which consists in circulating refrigerant through the generator, condenser, evaporator and absorber, cooling the condenser by external means and cooling the absorber by circulating refrigerant of the system in heat exchange relation with the absorber in a circuit independent of the generator and the evaporator.

11. That improvement in the art of refrigerating by the aid of a system including a generator, a condenser, an absorber and an evaporator which consists in circulating refrigerant through the generator, condenser, evaporator and absorber, cooling the condenser by external means and cooling the absorber by circulating refrigerant of the system in heat exchange relation with the absorber in a circuit independent of the generator and the evaporator and wherein refrigerant is vaporized in heat exchange relation with the absorber and is condensed in the condenser.

12. That improvement in the art of refrigerating by the aid of a system including a generator, a condenser, an absorber and an evaporator and containing a refrigerant, an absorption liquid and a pressure equalizing fluid so that the system is under substantially the same pressure throughout which consists in circulating refrigerant through the generator, condenser, evaporator and absorber, cooling the condenser by external means and cooling the absorber by circulating refrigerant of the system and at the system pressure in heat exchange relation with the absorber in a circuit independent of the generator and the evaporator.

13. That improvement in the art of refrigerating by the aid of a system including a generator, a condenser, an absorber and an evaporator and containing a refrigerant, an absorption liquid and a pressure equalizing fluid so that the system is under substantially the same pressure throughout which consists in circulating refrigerant through the generator, condenser, evaporator and absorber, cooling the condenser by external means and cooling the absorber by circulating refrigerant of the system and at the system pressure in heat exchange relation with the absorber in a circuit independent of the generator and the evaporator and wherein refrigerant is vaporized in heat exchange relation with the absorber and is condensed in the condenser.

14. Refrigerating apparatus comprising a generator, an absorber and an evaporator interconnected to form a system and comprising a member in heat exchange relation with the absorber, a condenser cooled by external means connected to receive vaporized refrigerant from both said member and said generator and means to conduct liquefied refrigerant from said condenser to said member and maintain said member substantially filled with liquid refrigerant.

15. Refrigerating apparatus comprising a generator, an absorber and an evaporator interconnected to form a system and comprising a member in heat exchange relation with the absorber, an air cooled condenser connected to receive vaporized refrigerant from both said member and said generator and means to conduct liquefied refrigerant from said condenser to said member.

16. That improvement in the art of refrigerating by the aid of an absorption system of the type wherein is circulated a refrigerant, an absorption fluid and an inert gas and comprising a generator, a condenser, an absorber and an evaporator which consists in circulating refrigerant through the generator, condenser, evaporator and absorber, cooling the condenser by external means and cooling the absorber by circulating fluid within the system in heat exchange relation with the absorber in a circuit independent of the generator and evaporator.

17. That improvement in the art of refrigerating by the aid of a system including a generator, a condenser, an absorber and an evaporator containing a refrigerant, an absorption fluid and a pressure equalizing fluid so that the system is under substantially the same pressure throughout which consists in circulating refrigerant through the generator, condenser, evaporator and absorber, cooling the condenser by external means and cooling the absorber by circulating fluid within the system and at the system pressure in heat exchange relation with the absorber in a circuit independent of the generator and evaporator.

In testimony whereof I hereunto affix my signature.

CARL GEORG MUNTERS.